(12) United States Patent
Schneider

(10) Patent No.: US 7,995,764 B2
(45) Date of Patent: *Aug. 9, 2011

(54) SHARING A SECRET USING HYPERPLANES OVER GF($2^m$)

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 453 days.

This patent is subject to a terminal disclaimer.

(21) Appl. No.: 12/200,896

(22) Filed: Aug. 28, 2008

(65) Prior Publication Data

US 2010/0054474 A1    Mar. 4, 2010

(51) Int. Cl.
*H04L 9/00* (2006.01)
(52) U.S. Cl. ............... 380/278; 380/277; 380/279
(58) Field of Classification Search .......... 380/277–279
See application file for complete search history.

(56) References Cited

U.S. PATENT DOCUMENTS

| | | | |
|---|---|---|---|
| 2002/0032866 A1* | 3/2002 | Suga | 713/180 |
| 2003/0081785 A1* | 5/2003 | Boneh et al. | 380/277 |
| 2004/0025018 A1* | 2/2004 | Haas et al. | 713/168 |
| 2004/0103276 A1* | 5/2004 | Jing et al. | 713/156 |
| 2004/0179686 A1* | 9/2004 | Matsumura et al. | 380/44 |
| 2005/0053045 A1* | 3/2005 | Chmora et al. | 370/338 |
| 2008/0232580 A1* | 9/2008 | Hosaka et al. | 380/28 |
| 2009/0144543 A1* | 6/2009 | Fujii et al. | 713/160 |
| 2010/0008505 A1* | 1/2010 | Bai | 380/255 |

FOREIGN PATENT DOCUMENTS

JP    2008233823 A * 10/2008

OTHER PUBLICATIONS

Schneier, Bruce, "Applied Cryptography, Second Edition—Protocols, Algorithms and Source Code in C", © 1996, John Wiley & Sons, Inc., title pages, pp. viii and 47-74.
Asmuth, Charles et al., "A Modular Approach to Key Safeguarding", *IEEE Transactions on Information Theory*, vol. IT-29, No. 2, Mar. 1983, pp. 208-210.
Blakley, G. R. et al., "Safeguarding Cryptographic Keys", *National Computer Conference, 1979, AFIPS—Conference Proceedings*, vol. 48, AFIPS Press, Montvale, NJ 07645, pp. 313-317.
Blakley, G. R. et al., "Security of Ramp Schemes", *Lecture Notes in Computer Science—Advances in Cryptology, Proceedings of CRYPTO 84*, Springer-Verlag, pp. 242-268.
Shamir, Adi et al., "How to Share a Secret", *Programming Techniques, Communications of the ACM*, Nov. 1979, vol. 22, No. 11, pp. 612-613.

* cited by examiner

*Primary Examiner* — Nasser Moazzami
*Assistant Examiner* — Lisa Lewis
(74) *Attorney, Agent, or Firm* — Lowenstein Sandler PC

(57) ABSTRACT

A method and system distributes N shares of a secret among cooperating entities using hyperplanes over GF($2^m$), such that the secret can be reconstructed from K of the N shares (where K≤N). In one embodiment, the secret is represented as a secret bit string of length m, which is embedded in a K-tuple. The K-tuple is then extended to an N-tuple by a linear transformation using arithmetic defined on GF($2^m$). N shares of the secret bit string are generated, with each of the N shares including an element of the N-tuple.

13 Claims, 8 Drawing Sheets

SECRET SHARING

MATRIX CONVERSION FOR SECRET RECONSTRUCTION

SHARING A SECRET USING HYPERPLANES OVER GF(2^m)

CROSS-REFERENCE TO RELATED APPLICATIONS

The present application is related to U.S. application Ser. No. 12/200,895, filed Aug. 28, 2008, currently pending, and U.S. application Ser. No. 12/200,897, filed Aug. 28, 2008, currently pending, which are assigned to the same assignee as the present application.

TECHNICAL FIELD

Embodiments of the present invention relate to cryptographic techniques, and more specifically, to sharing a secret among cooperating parties.

BACKGROUND

In cryptography, secret sharing refers to any method for distributing a secret among a group of participants, each of which is allocated one or more shares of the secret. The secret can only be reconstructed when a required number of shares are combined together; individual shares are of no use on their own.

A secure secret sharing scheme distributes shares so that anyone with fewer than the required shares has no extra information about the secret than someone with zero shares. Some secret sharing schemes allow the secret to be reconstructed by a subset of the total number of generated shares. Thus, a secret can be reconstructed even when some of the share are lost or when some of the share holders are absent.

In general, known secret sharing techniques are defined in the integer ring, which involve manipulation of integers of large sizes. Large integers are not suitable for computer operations. Thus, there is a need to develop a secret sharing technique that overcomes the above inherent limitation of the known techniques.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
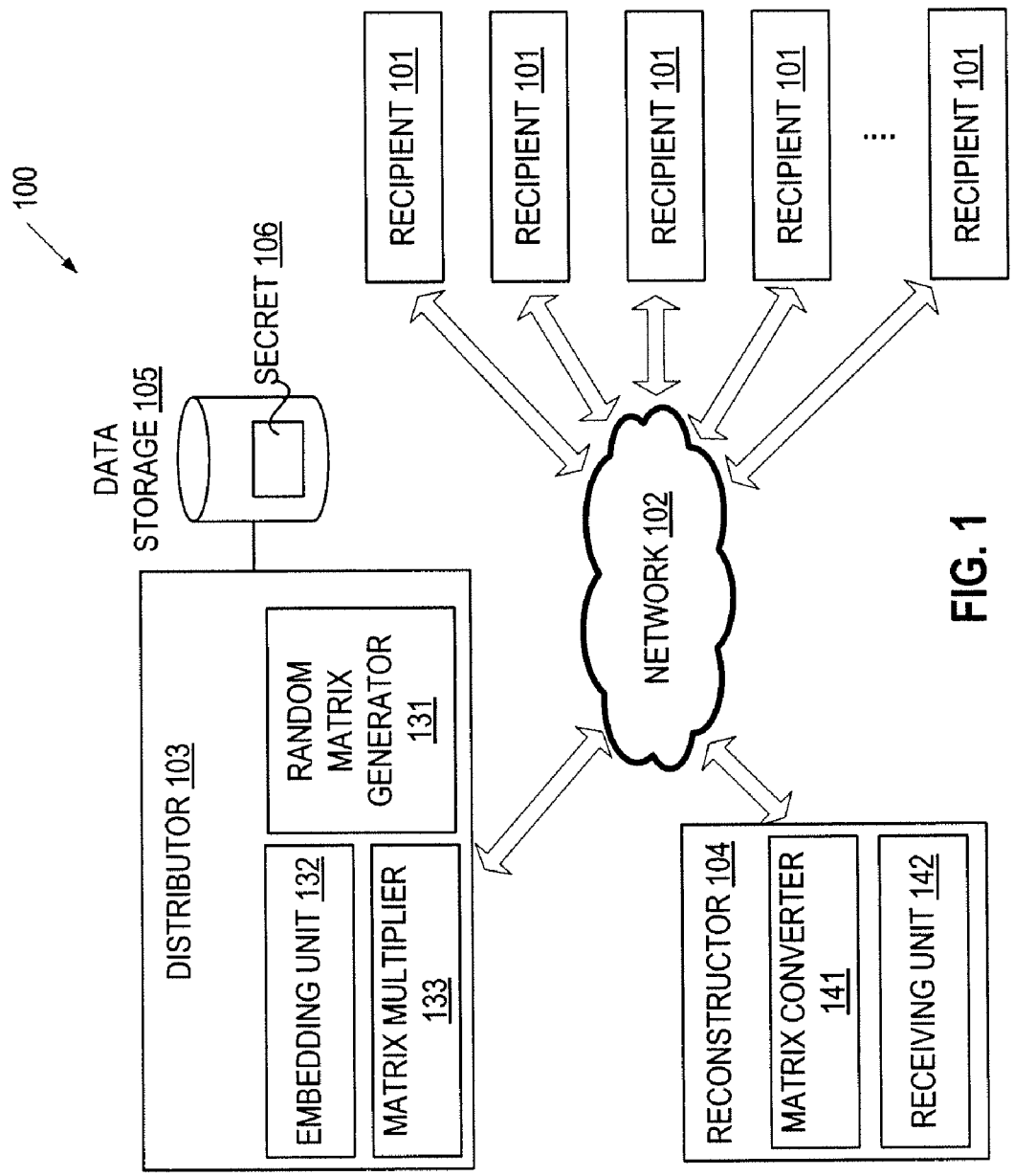
FIG. 1 illustrates a network architecture in which embodiments of the present invention may be implemented.

A method and system distributes N shares of a secret among cooperating entities using hyperplanes over $GF(2^m)$, such that the secret can be reconstructed from K of the N shares (where $K \leq N$). In one embodiment, the secret is represented as a secret bit string of length m, which is embedded in a K-tuple. The K-tuple is then extended to an N-tuple by a linear transformation using arithmetic defined on $GF(2^m)$. N shares of the secret bit string are generated, with each of the N shares including an element of the N-tuple.

An exemplary use of the secret sharing technique is a multi-factor key escrow system, where shares from a master key are given to a set of federated entities such that a subset of these shares can be used to reconstruct the master key. For example, an employee of a company in a high-security position (e.g., a corporate controller, or a human resources specialist) may have a master password that protects a secret key they need to use to authenticate on their corporate workstation. Ordinarily, this master key is only used by this employee. However, if something were to happen to this employee, his/her replacement would need to be able to gain access to this master key. As the master key provides its owner access to sensitive data, the company cannot just give a backup copy of the master key to someone for safe keeping (e.g., it would be disastrous if a disgruntled employee was able to cut himself a million dollar severance check). Thus, the master key can be split up into multiple shares, so that a share is held by each of several trusted employees. A minimum number of these trusted employees would need to present their shares and reconstruct the secret (i.e., the master key). Illustratively, one share may go to the employee's boss, and other shares may be distributed to other department heads or managers.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "representing", "embedding", "generating", "extending", "multiplying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary cryptosystem 100 in which embodiments of the present invention may operate. The cryptosystem 100 includes a plurality of recipients 101 and a distributor 103 coupled by a network 102, which may be a public network (e.g., Internet) or a private network (e.g., Ethernet or a Local Area Network (LAN)). In one embodiment, each of the distributor 103 and recipients 101 is a computing system that manages secret information. Alternatively, the distributor 103 may be a computing system and each recipient 101 may be a storage device for receiving and storing one or more shares of a secret. The distributor 103 is locally coupled to data storage 105 in which a secret 106 is stored. Data storage 105 may include one or more storage devices (e.g., the computer-readable medium described above) that are local to the distributor 103 and/or remote from the distributor 103. In alternative embodiments, the secret 106 may be stored in the main memory of the distributor 103. In one embodiment, the secret 106 may be a cryptographic key, a password, or any secret data to be jointly held in escrow by the recipients 101.

To safeguard the secret 106, the distributor 103 generates a plurality of shares of the secret 106 and distributes one or more shares to each of the recipients 101 through the network 102. The secret 106 can be reconstructed from a subset of the distributed shares. In one embodiment, the cryptosystem 100 also includes a reconstructor 104 to reconstruct the secret 106 using the distributed shares. The reconstructor 104 collects the received shares of the secret to form a matrix, and converts part of the matrix into an identity matrix. The original secret can be extracted from the remaining portion of the converted matrix. A person of ordinary skill in the art would appreciate that the reconstructor 104 may be a separate computing system as shown in FIG. 1, or, alternatively, reside in the same computing system as the distributor 103 or any of the recipients 101. In one embodiment, the distributor 103, the recipients 101 and/or the reconstructor 104 may be, for example, servers, personal computers (PCs), mobile phones, palm-sized computing devices, personal digital assistants (PDAs), or the like.

In one embodiment, the distributor 103 includes a random matrix generator 131, an embedding unit 132, and a matrix multiplier 133 to generate the shares. The reconstructor 104 includes a receiving unit 142 to collect shares of the secret 106 from the recipients 101, and a matrix converter 141 to reconstruct the secret 106 from the distributed shares. Each of the random matrix generator 131, the embedding unit 132, the matrix multiplier 133, and the matrix converter 141 includes arithmetic processing units, such as adders, multipliers, random element generators, subtractors, etc., as well as memory circuitry, such as registers, RAM, etc., to perform mathematical calculations. The functions of these components will be described in greater detail below in connection with FIGS. 2-7.

Figure 2:
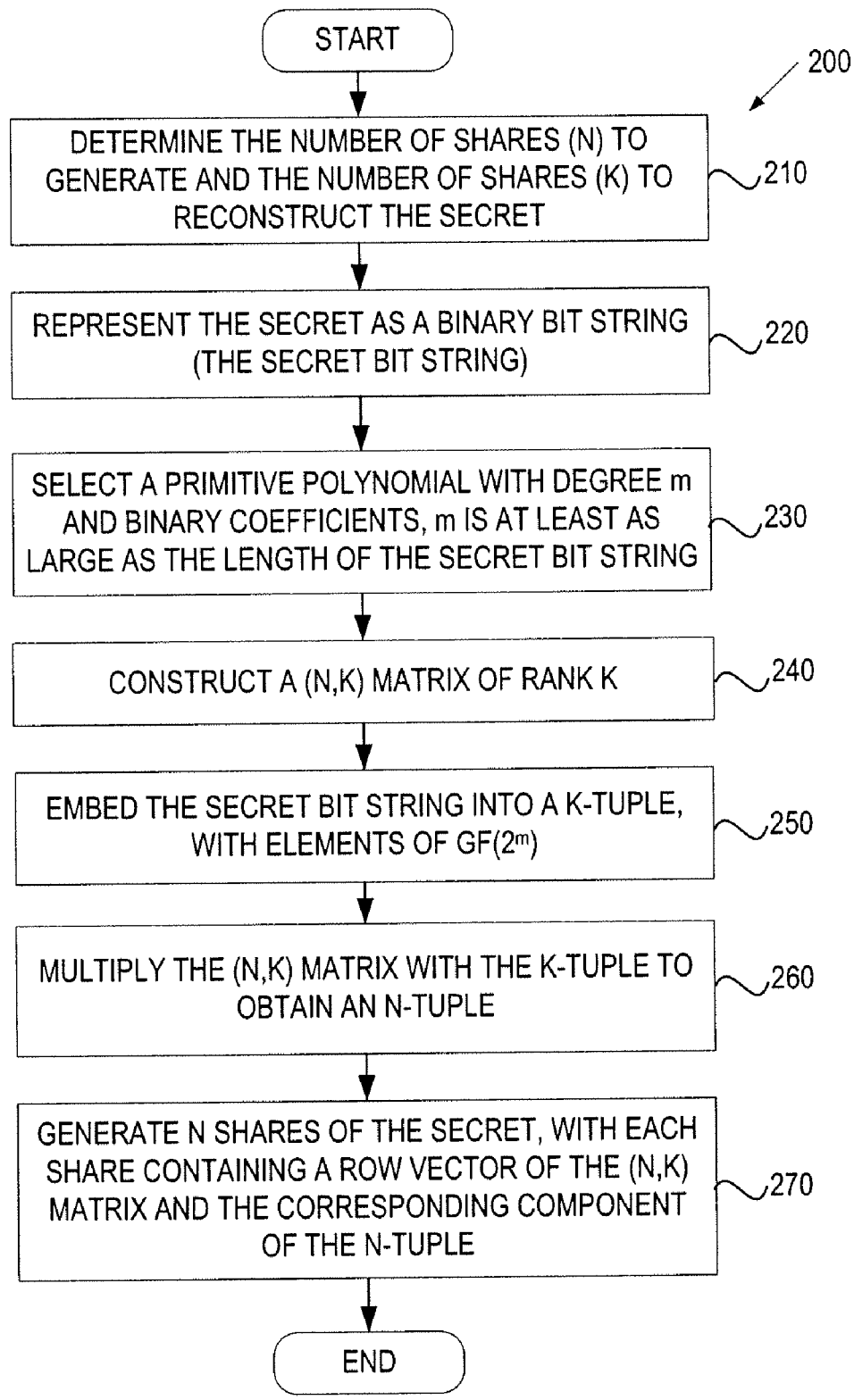
FIG. 2 is a flow diagram of a secret sharing method according to one embodiment of the present invention.

FIG. 2 illustrates a flow diagram of one embodiment of a method 200 for generating a plurality of shares from a secret (e.g., the secret 106). The method 200 may be performed by the processing logic 826 of FIG. 8 that may comprise hardware (e.g., circuitry, dedicated logic, programmable logic, microcode, etc.), software (such as instructions on a computer readable storage medium executable by a processing device), or a combination thereof. In one embodiment, the method 200 is performed by the distributor 103 of FIG. 1.

Referring to FIG. 2, at block 210, the method 200 begins with the distributor 103 determining the total number (N) of shares to be generated and the number (K) of shares for reconstruction. Alternatively, the determination may be made by a user or an administrator of the distributor 103, based on the available computing or storage resources and the available number of recipients 101 that can jointly hold the shares of the secret. At block 220, if the secret is stored in a format other than a binary bit string, the distributor 103 converts the secret into a binary bit string (referred to as the secret bit string) having length s. For example, the secret may be stored as an integer or an ASCII code sequence, which can be converted into a binary bit string using known techniques. The binary bit string represents an element of $GF(2^m)$; that is, a bit string having m binary terms (where m is as least as large as the length s of the secret bit string). In polynomial notation, a binary bit string can be represented as a polynomial having m binary coefficients. The polynomial is referred to as a polynomial over GF(2). The factor "m" herein determines the degree of a primitive polynomial that generates the field of $GF(2^m)$, which is to be described below.

At block 230, the distributor 103 selects a primitive polynomial over GF(2) with degree m (i.e., the coefficient of the m-th degree term is 1). The degree m is selected to be at least as large as the length s of the secret bit string. For example, if the secret is a 256-bit bulk cipher key, the degree m of the primitive polynomial is at least 256. A primitive polynomial over GF(2) of degree m is a polynomial with coefficients from GF(2) with roots in GF($2^m$), where each root is a primitive element of GF($2^m$). Such polynomials have characteristic properties that allow them to be identified (e.g., for a polynomial p of degree m, the smallest integer n that makes $x^n=1$ (modulo p) true is $2^m-1$). The primitive polynomial can be used to construct a representation of the field. In the case of GF($2^m$), the construction takes the form of bit strings of length m, which represent elements of GF($2^m$) in what is known as the "polynomial basis." As it turns out, the polynomial basis is convenient for performing multiplication and addition of elements of GF($2^m$), since addition is a bitwise XOR and multiplication can be implemented as a series of shifts and XORs. Division by the primitive polynomial can also be implemented as a series of shifts and XORs.

Continuing to block 240, the random matrix generator 131 of the distributor 103 constructs a (N×K) matrix with N rows and K columns of random elements. Each random element is a binary bit string of length m, which is an element of GF($2^m$). The (N×K) matrix has rank K; that is, the matrix has K linearly independent columns. As a matrix of size (N×K) can at most have K linearly independent columns, the matrix is said to have full rank or maximal rank. Two embodiments of generating a full rank matrix of size (N×K) will be described in greater detail with reference to FIGS. 5 and 6. In a first embodiment illustrated in FIG. 5, the random matrix generator 131 first populates the (N×K) matrix with random elements of GF($2^m$), and then verifies the rank of the matrix. The matrix rank can be verified by reducing the matrix to an upper (or lower) triangular matrix of an equivalent rank. The reduction is performed by a sequence of multiply-and-subtract operations. In a second embodiment illustrated in FIG. 6, the random matrix generator 131 uses a sequence of multiply-and-add operations to generate a full-rank matrix of size (N×K) directly. It is noted that, for elements of GF($2^m$), addition and subtraction are the same (produce the same results), and can be implemented by XOR operations.

Continuing to block 250, the embedding unit 132 of the distributor 103 embeds the secret bit string into a K-tuple. Each component of the K-tuple is an element of GF($2^m$). In one embodiment, the embedding unit 132 generates (K−1) random elements of GF($2^m$). One of the components of the K-tuple (e.g., the last component) is the secret bit string, which is augmented into a binary bit string of length m (if its original length is less than m). For example, the secret bit string may be augmented by pre-appending one or more "0" or "1" bits.

Continuing to block 260, the matrix multiplier 133 of the distributor 103 multiplies the (N×K) matrix generated at block 240 with the K-tuple generated at block 250. The K-tuple is represented as a (K×1) matrix for the multiplication. The multiplication is performed using arithmetic defined for elements of GF($2^m$), modulo the primitive polynomial selected at block 230. The multiplication produces an N-tuple, with each component of the N-tuple an element of GF($2^m$).

Continuing to block 270, the distributor 103 generates N shares of the secret, using the (N×K) matrix generated at block 240 and the N-tuple generated at block 260. Each share includes (K+1) components: K components come from one of the N rows of the (N×K) matrix, and an additional component comes from the corresponding component of the N-tuple (e.g., row R of the matrix and R-th component of the N-tuple). The (K+1) components of each share represent an equation for a K-dimensional hyperplane over GF($2^m$). The distributor 103 then distributes the N shares and the method 200 terminates.

It is understood that the above operations can follow a different sequence from what is shown in FIG. 2. For example, the generation of the (N×K) matrix can be performed after the generation of the K-tuple. It is also understood that the row and column dimensions of the (N×K) matrix can be transposed as long as the corresponding matrix operations are transposed as well.

The computation performed by the above-described secret sharing technique uses modular arithmetic defined on GF($2^m$). That is, the polynomial operations are performed on 0 and 1 only. It is not necessary to keep track of the carryovers during the computation, as the addition of two corresponding polynomial terms (the same degree terms) generates no carry to a term of a higher degree (that is, the addition of the constant terms does not carry over to the $1^{st}$ degree term, the addition of the $1^{st}$ degree terms does not carry over to the $2^{nd}$ degree terms, etc.). It is understood that equivalent operations can be performed without involving matrix operations. For example, the distributor 103 may generate N linear equations in K variables over GF($2^m$), and evaluate each of the equations at the secret K-tuple. This linear equation approach is equivalent to the operations in matrix form.

Figure 3:
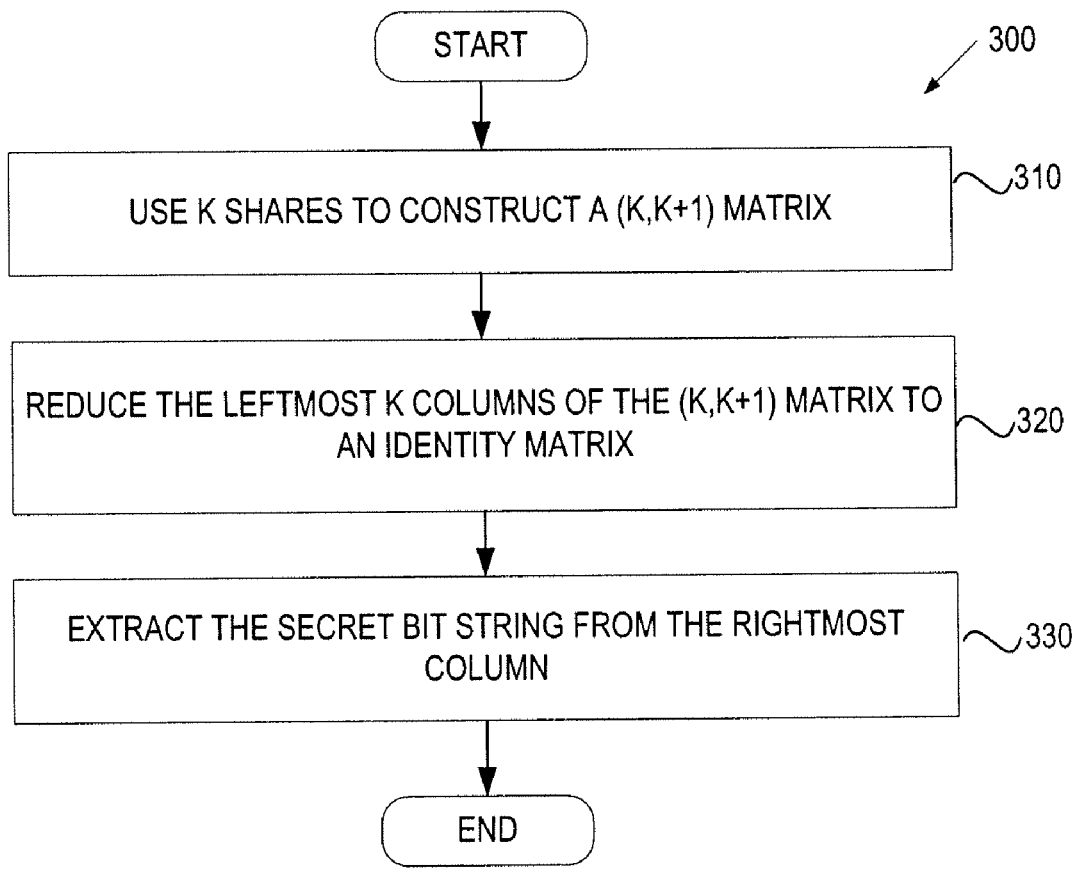
FIG. 3 is a flow diagram of a secret reconstruction method according to one embodiment of the present invention.

FIG. 3 illustrates a flow diagram of one embodiment of a method 300 for reconstructing the secret from a subset of the distributed shares. The method 300 may be performed by the processing logic 826 of FIG. 8 that may comprise hardware (e.g., circuitry, dedicated logic, programmable logic, microcode, etc.), software (such as instructions on a computer readable storage medium executable by a processing device), or a combination thereof. In one embodiment, the method 300 is performed by the reconstructor 104 of FIG. 1.

Referring to FIG. 3, at block 310, the method 300 begins with the reconstructor 104 collecting K of the N distributed shares from the recipients 101. Each of the K shares is placed in a separate row to form a (K, K+1) matrix. At block 320, the matrix converter 141 converts the leftmost K columns of the (K, K+1) matrix into an identity matrix. An identity matrix has identity elements (e.g., 0001 in GF($2^4$)) along the diagonal and zeros elsewhere. The conversion can be performed by a sequence of multiplications and additions. After the conversion, the rightmost column of the (K, K+1) matrix is the K-tuple generated at block 250 of FIG. 2. The reconstructor 104 may have communicated with the distributor 103 with respect to recovery of the secret bit string from the K-tuple (e.g., the location of the secret bit string in the K-tuple). At block 330, the reconstructor 104 extracts the secret bit string from the K-tuple from the rightmost column of the converted matrix. The method 300 then terminates.

Having described the techniques for share generation and reconstruction, the following descriptions explain, in detail, embodiments of the techniques for generating a full rank matrix (which are the operations performed at block 240 of FIG. 2), and for converting a matrix into an identity matrix (which are the operations performed at block 320 of FIG. 3).

Figure 4A:
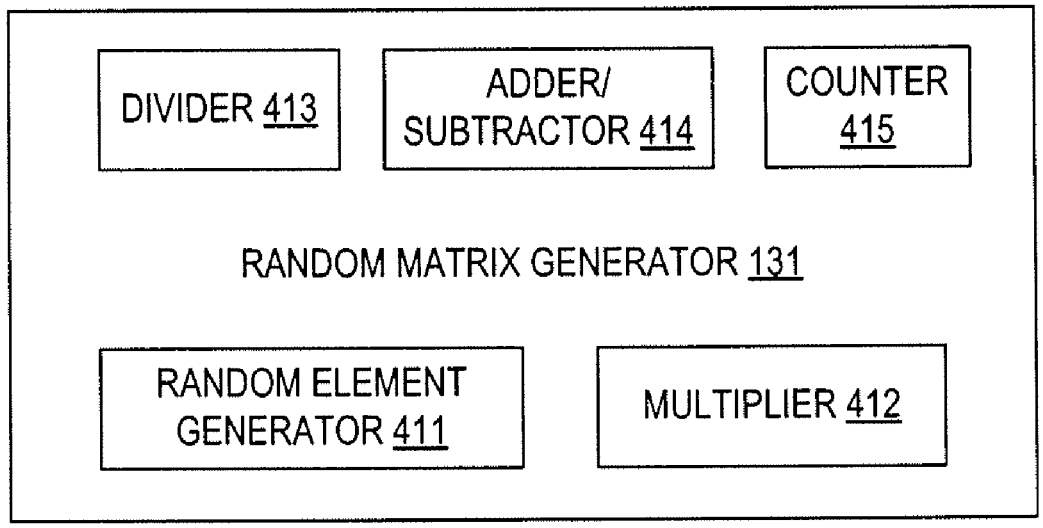
FIG. 4 illustrates a block diagram of one embodiment of a random matrix generator for generating shares and a matrix converter for secret reconstruction.

FIG. 4A illustrates an embodiment of the random matrix generator 131 (of FIG. 1) that generates a full rank matrix (N×K). In the embodiment of FIG. 4A, the random matrix generator 131 includes a random element generator 411 to generate random elements of GF($2^m$), a multiplier 412 to multiply elements of GF($2^m$), a divider 413 to divide elements of GF($2^m$), an adder/substractor 414 to perform addition and subtraction (which are the same in GF($2^m$)), and a counter 415 to keep track of the progress of the computation. In one embodiment, the adder/substractor 414 can be implemented by a sequence of XOR operators.

Figure 4B:
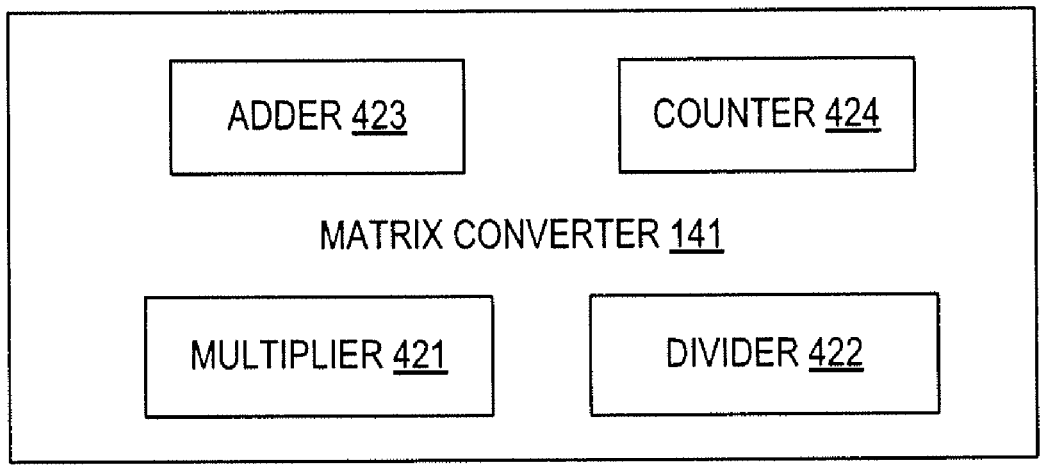

FIG. 4B illustrates an embodiment of the matrix converter 141 (of FIG. 1) that converts a given matrix into an identity matrix. In the embodiment of FIG. 4B, the matrix converter 141 includes a multiplier 421 to multiply elements of GF($2^m$), a divider 422 to divide elements of GF($2^m$), an adder 423 to perform addition, and a counter 424 to keep track of the progress of the computation. In one embodiment, the adder 423 can be implemented by a sequence of XOR operators.

Figure 5:
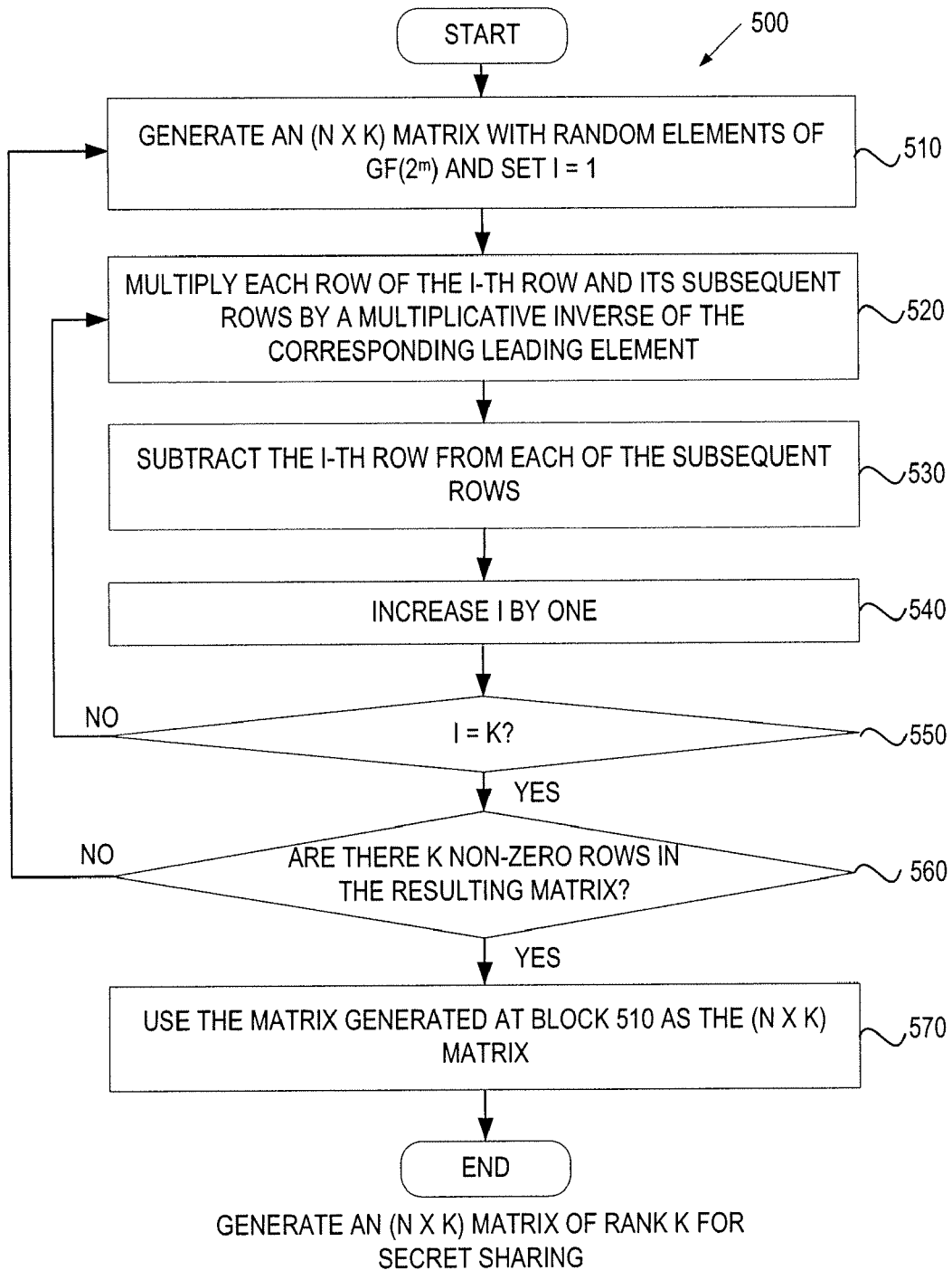
FIG. 5 illustrates a flow diagram of one embodiment of a method for generating a full rank random matrix for secret sharing.

FIG. 5 illustrates a flow diagram of a first embodiment of a method 500 for generating a full rank matrix. The method 500 can be applied to a matrix of any size, including a rectangular matrix and a square matrix. The method 500 may be performed by the processing logic 826 of FIG. 8 that may comprise hardware (e.g., circuitry, dedicated logic, programmable logic, microcode, etc.), software (such as instructions on a computer readable storage medium executable by a processing device), or a combination thereof. In one embodiment, the method 500 is performed by the random matrix generator 131 of FIG. 1 and FIG. 4A.

Referring to FIG. 5, at block 510, the random element generator 411 of the random matrix generator 131 generates an (N×K) matrix with random elements of GF($2^m$). After the generation of the matrix, the random matrix generator verifies the rank of the matrix. To verify that the rank of the matrix is K, the random matrix generator 131 performs a sequence of row operations to reduce the matrix into an upper triangular matrix (i.e., a matrix with all of its elements below the diagonal being zero). The verification process starts with setting the value I of the counter 415 to one. The value I indicates the row number being processed.

At block 520, the multiplier 412 multiplies each of the I-th row and the rows below the I-th row by a multiplicative inverse of its non-zero leading term. The multiplicative inverse of a term 'A' can be computed by solving the expression Ax+fy=i, where f is the primitive polynomial that generates GF($2^m$), i is the multiplicative identity of GF($2^m$) (e.g., 0001 in GF($2^4$)) and x is the multiplicative inverse of A. A known technique for solving the above expression is the extended Euclidean algorithm, which is an iterative algorithm that includes a sequence of division (performed by the divider 413), multiplication (performed by the multiplier 412) and subtraction (performed by the adder/subtractor 414). Computing the multiplicative inverse in a finite field using the extended Euclidean algorithm is known in the art. Thus, the details of the computation are omitted to simplify the discussion.

After the rows (from I to N) are multiplied by a multiplicative inverse of its respective leading non-zero term, each of these rows has a non-zero leading term equal to the identity element of GF($2^m$).

At block 530, the adder/subtractor 414 subtracts the I-th row from each of the subsequent rows. As each element of the rows is an element of GF($2^m$), in one embodiment, the adder/subtractor 414 performs the subtraction using XOR operations.

Proceeding to block 540, the counter 415 increases the counter value I by one to process the next row. If the counter value I is equal to K at block 550, the method 500 proceeds to block 560. If, at block 550, the counter value I is less than K, the operations at blocks 520-540 are repeated until I=K, and the method 500 proceeds to block 560.

At block 560, the random matrix generator 131 determines whether there are K non-zero rows in the resulting matrix. If it is determined that there are K non-zero rows in the resulting matrix, the rank of the matrix is K, and the method 500 proceeds to block 570. If it is determined that there are fewer than K non-zero rows in the resulting matrix, the rank of the matrix is less than K. Thus, the operations at blocks 510-560 are repeated until a matrix of rank K is generated and the method 500 proceeds to block 570. At block 570, it has been verified that the matrix generated at block 510 has rank K and can be used as the (N×K) matrix for generating shares of a secret. The method 500 then terminates.

Figure 6:
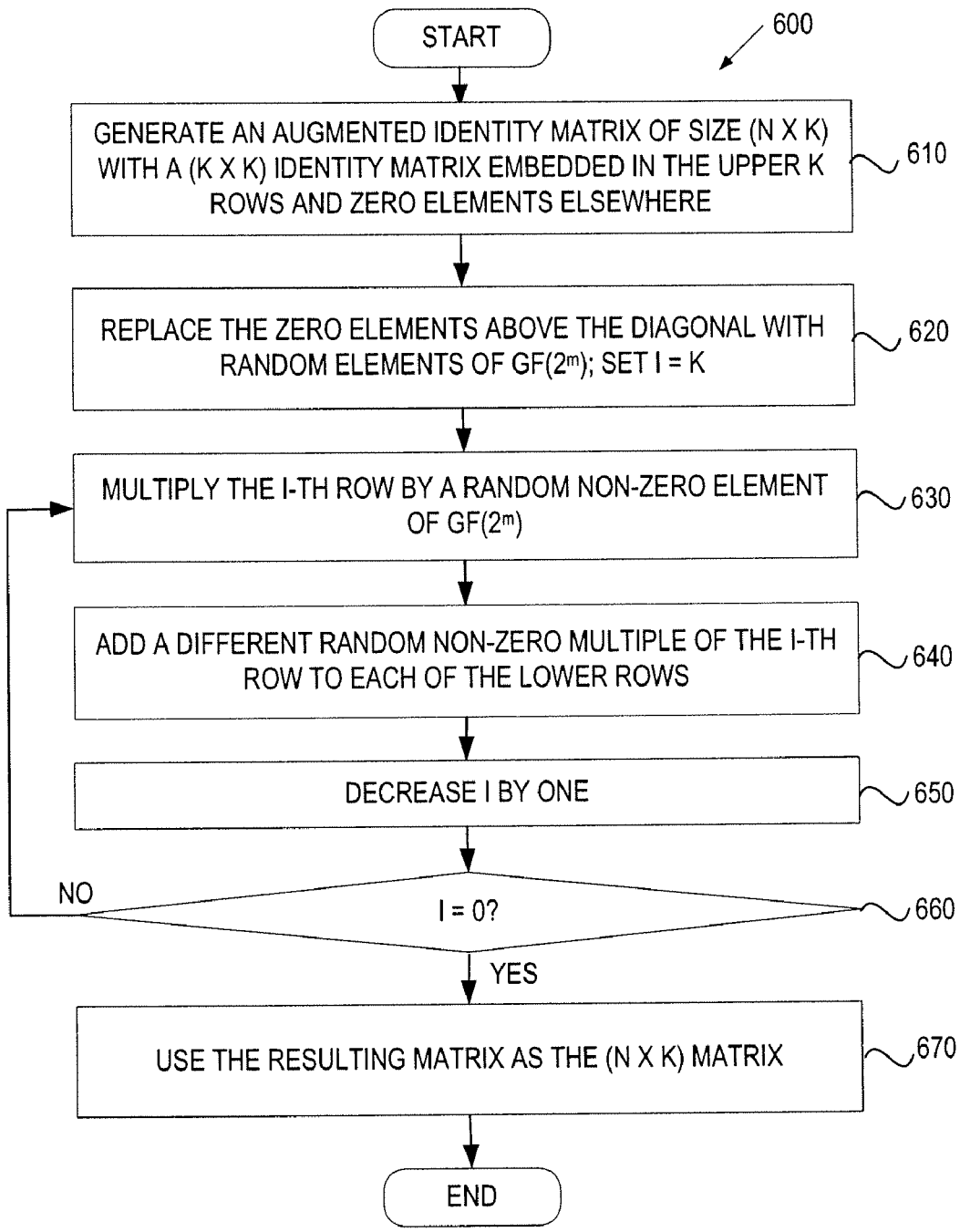
FIG. 6 illustrates a flow diagram of an alternative embodiment of a method for generating a full rank random matrix for secret sharing.

FIG. 6 illustrates a flow diagram of a first embodiment of a method 600 for generating a full rank matrix. The method 600 can be applied to a matrix of any size, including a rectangular matrix and a square matrix. The method 600 may be performed by the processing logic 826 of FIG. 8 that may comprise hardware (e.g., circuitry, dedicated logic, programmable logic, microcode, etc.), software (such as instructions on a computer readable storage medium executable by a processing device), or a combination thereof. In one embodiment, the method 600 is performed by the random matrix generator 131 of FIG. 1 and FIG. 4A.

Referring to FIG. 6, at block 610, the random matrix generator 131 generates an augmented identity matrix of size (N×K), with a (K×K) identity matrix embedded in the upper rows and zero elements above and below the diagonal. An identity matrix is a matrix that has the identity element of GF($2^m$) as the diagonal elements. At block 620, the random element generator 411 of the random matrix generator 131 generates non-zero random elements of GF($2^m$) and replaces the zero elements above the diagonal with the random elements. The random matrix generator 131 then starts to populate the matrix with non-zero random elements by performing a sequence of multiply and add operations on the rows. At this point, the value I of the counter 415 is set to K, which indicates the row number being operated on. At block 630, the multiplier 412 multiplies the I-th row by a non-zero random element of GF($2^m$). At block 640, another non-zero random element of GF($2^m$) is generated and multiplied with the I-th row. This random multiple of the I-th row is added, by the adder/subtractor 414, to a row below the I-th row. The operation of block 640 is repeated for each of the rows below the I-th row, each time with a new non-zero random element generated and multiplied with the I-th row, and the resulting multiple of the I-row added to each of the rows below the I-th row.

At block 650, the counter value I is decreased by one. If, at block 660, the counter value I is equal to zero, the method 600 proceeds to block 670. Otherwise, the operations at blocks 630-650 are repeated until I=1, and the method 600 proceeds to block 670. At block 670, the resulting matrix is the rank K matrix of (N×K). The resulting matrix has the same amount of random information used in its construction as an (N×K) matrix generated by the method 500 of FIG. 5.

As an example, with N=3 and K=2, a sequence of operations for generating the resulting matrix according to the method 600 is shown below, where a, b, c, d, e, f are six random elements of GF($2^m$) and i is the identity element of GF($2^m$).

| i | a | | i | a | | i | a | | d | ad | | d | ad |
|---|---|---|---|---|---|---|---|---|---|-----|---|---|-----|
| 0 | i | → | 0 | b | → | 0 | b | → | 0 | b | → | de | b + ade |
| 0 | 0 | | 0 | 0 | | 0 | bc | | 0 | bc | | df | bc + adf |

Figure 7:
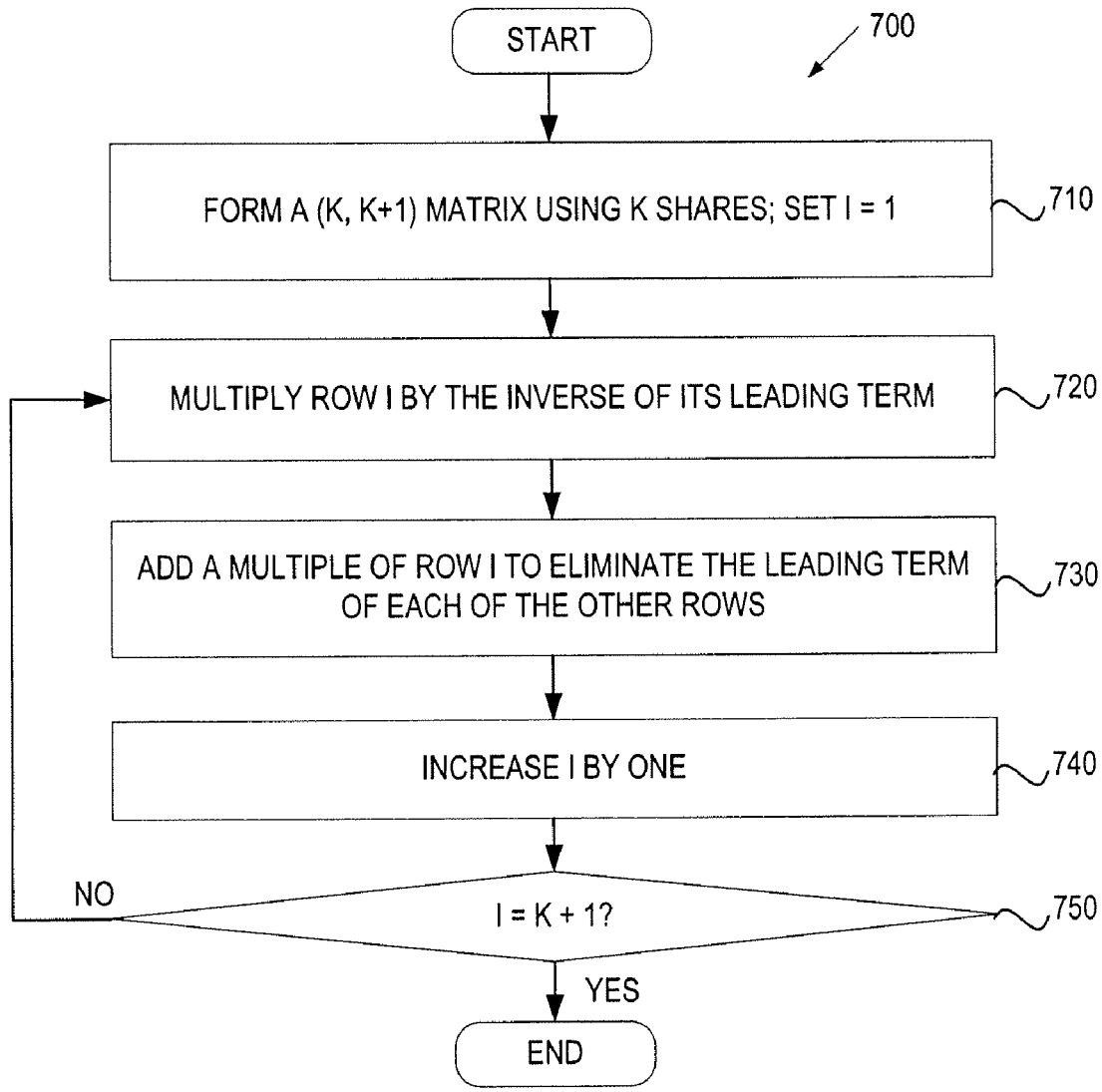
FIG. 7 a flow diagram of one embodiment of a method for converting a matrix of collected shares to extract the secret.

FIG. 7 illustrates a flow diagram of an embodiment of a method 700 for converting the matrix of collected shares to extract the secret. The method 700 may be performed by the processing logic 826 of FIG. 8 that may comprise hardware (e.g., circuitry, dedicated logic, programmable logic, microcode, etc.), software (such as instructions on a computer readable storage medium executable by a processing device), or a combination thereof. In one embodiment, the method 700 is performed by the reconstructor 140 of FIG. 1 and FIG. 4B.

Referring to FIG. 7, at block 710, the reconstructor 140 forms a (K, K+1) matrix using K of the N distributed shares. The matrix converter 141 of the reconstructor 140 sets its counter 424 to one, which means row one is the current target row. At block 720, the matrix converter 141 computes the inverse of the leading term of the target row, and multiplies the target row by the computed inverse. At block 730, the matrix converter 141 adds an appropriate multiple of the target row to each of the other rows to eliminate the off-diagonal elements in the corresponding target column (e.g., if row 1 is the target row, the corresponding column is column 1). At block 740, the matrix converter 141 increments the counter 424 by one. Thus, the target column and row number is also incremented by one. At block 750, if the counter has not reached the last row (row N), the operations of blocks 720-740 are repeated until the last row is reached. When the method 700 ends, all the off-diagonal elements of the leftmost (K×K) portion of the matrix are eliminated. The rightmost column of the matrix is the ordered K-tuple that contains the secret as one of its components.

The following is an example of the secret sharing and reconstruction technique described above. In this example, the secret is an ASCII code for the letter "A" (which is 65 in decimal representation and 0100 0001 in binary representation). The field on which the operations are defined is $GF(2^9)$, and the primitive polynomial is chosen to be $x^9+x^4+1$. Assume that an (N, K) scheme is used with N=4 and K=3. As the order of the field $GF(2^9)$ is 9, each element of $GF(2^9)$ has 9 bits.

In this example, the secret bit string is extended into an ordered triplet with components being elements of $GF(2^9)$. As the length of the secret bit string (which equals 8) is less than the order of the field (which equals 9), the secret bit string is augmented into 9 bits by pre-pending either a zero or a one. The ordered triplet may be (1 1010 0111, 0 0101 0010, 1 0100 0001), where the first two components are random values and the last component is the secret bit string augmented by pre-pending a one.

Continuing with the above example, a (4×3) matrix of elements of $GF(2^9)$ is generated with rank 3, which is equivalent to constructing 4 triplets of elements of $GF(2^9)$ such that none of them can be constructed as a linear combination of any less than three of the others. The rank of the matrix determines whether it is possible to reconstruct the original secret. If the rank is not equal to the number of required shares (K), the secret cannot be reconstructed.

Using the first embodiment of matrix generation illustrated in FIG. 5, a random matrix M of size (4×3) is generated with random elements of $GF(2^9)$. For example, the matrix M is generated as:
000101110 101010000 100011100
000011000 011010101 110010000
110111110 000111001 111011010
011111111 000101100 000101010

The rank of matrix M can be verified by first multiplying each row by the multiplicative inverse of its leading term:
000000001 101100000 111010110 (multiplied by 010001111)
000000001 100111111 111100001 (multiplied by 000111110)
000000001 101000110 011100100 (multiplied by 010111010)
000000001 111100010 010110111 (multiplied by 010011110)

Subtract the first row from each subsequent row (which can be performed by bitwise XOR operations):
000000001 101100000 111010110
000000000 001011111 000110111
000000000 000100110 100110010
000000000 010000010 101100001

Multiply the second and subsequent rows by the multiplicative inverse of its leading non-zero term:
000000001 101100000 111010110
000000000 000000001 001111110
000000000 000000001 111000010
000000000 000000001 1010000001

A person of ordinary skill in the art would recognize, at this point, that the last three rows are distinct and, therefore, the original matrix M has rank 3. However, the operations can continue until all of the matrix elements below the diagonal are eliminated (that is, the matrix becomes an upper triangular matrix). Subtract row 2 from rows 3 and 4, multiply rows 3 and 4 by the multiplicative inverse of their leading non-zero terms, and then subtract
000000001 101100000 111010110
000000000 000000001 001111110
000000000 000000000 000000001
000000000 000000000 000000000

The resulting matrix has three non-zero rows. Thus, the above operations prove that the original matrix M has rank 3. This means the original random matrix M can be used for generating the shares of the secret. If matrix M has a rank less than 3, a new random matrix of (4×3) is generated and the rank of that new matrix is verified. The operations are repeated until a random matrix of rank 3 is generated. It is understood that the second embodiment illustrated in FIG. 6 can also be used to generate a random matrix.

Continuing with the above example, the original matrix M is multiplied by the ordered triplet (expressed as a 3×1 matrix):

| 000101110 | 101010000 | 100011100 |   |           |   | 001000000 |
|-----------|-----------|-----------|---|-----------|---|-----------|
| 000011000 | 011010101 | 110010000 | * | 110100111 | = | 100101000 |
| 110111110 | 000111001 | 111011010 |   | 001010010 |   | 111011000 |
| 011111111 | 000101100 | 000101010 |   | 101000001 |   | 101110111 |

The shares are the ordered quadruplets (000101110, 101010000, 100011100, 001000000), (000011000, 011010101 110010000, 100101000), (110111110, 000111001, 111011010, 111011000), and (011111111, 000101100, 000101010, 101110111).

Reconstructing the secret involves constructing a (3×4) matrix from the given shares, and reducing the leftmost three columns to a (3×3) identity matrix using row operations. As a result, the secret ordered triplet will be the far rightmost column. For example, using the first three shares, the following matrix can be constructed:
000101110 101010000 100011100 001000000
000011000 011010101 110010000 100101000
110111110 000111001 111011010 111011000

Multiply row 1 by the inverse of 000101110 (010001111), add the appropriate multiple of row 1 to each of the other rows, yielding:
000000001 101100000 111010110 011000001
000000000 100111011 011011001 101100101
000000000 111001101 101110010 100011100

Multiply row 2 by the inverse of 100111011, add the appropriate multiple of row 2 to each of the other rows, yielding:
000000001 000000000 011000000 010101100
000000000 000000001 001111110 010001101
000000000 000000000 101011011 000111001

Finally, multiply row 3 by the inverse of 101011011, and add the appropriate multiple of row 3 to rows 1 and 2. The far right column of the resulting matrix is the secret ordered triplet.
000000001 000000000 000000000 110100111
000000000 000000001 000000000 001010010
000000000 000000000 000000001 1010000001

Figure 8:
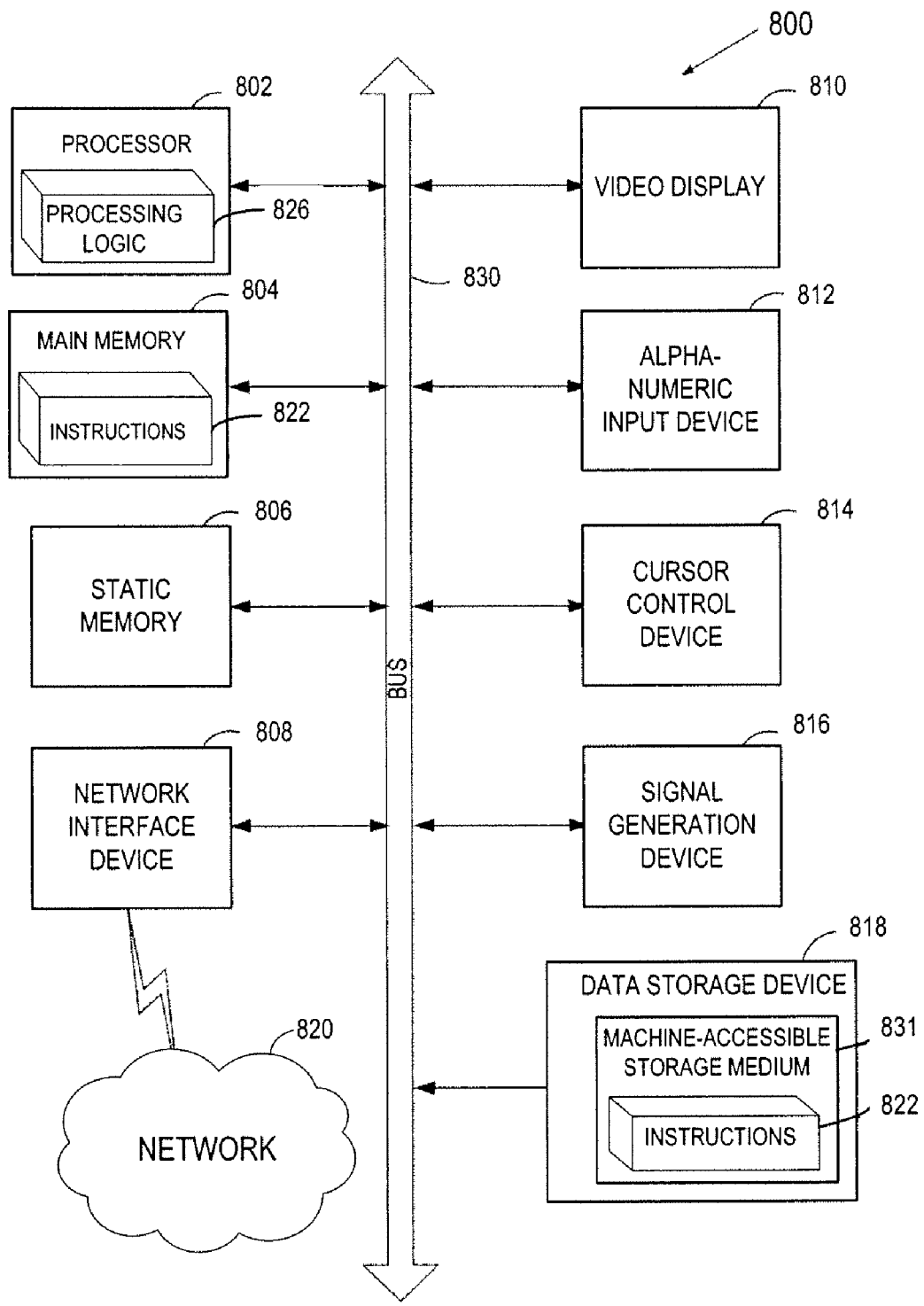
FIG. 8 illustrates a block diagram of an exemplary computer system implementing some embodiments of the present invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-readable storage medium (or more specifically a computer-readable storage medium) 831 on which is stored one or more sets of instructions (e.g., software 822) embodying any one or more of the methodologies or functions described herein. The software 822 may also reside, completely or at least partially, within the main memory 804 and/or within the processing device 802 during execution thereof by the computer system 800, the main memory 804 and the processing device 802 also constituting machine-readable storage media. The software 822 may further be transmitted or received over a network 820 via the network interface device 808.

The machine-readable storage medium 831 may also be used to store the secret 106 of FIG. 1. While the machine-readable storage medium 831 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and a system for sharing a secret using hyperplanes over $GF(2^m)$ have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method for distributing a secret, the method comprising:
representing the secret as a secret bit string of length m;
embedding, by a processor, the secret bit string in a K-tuple, wherein K is the number of shares necessary for secret reconstruction;
extending the K-tuple to an N-tuple by a linear transformation using arithmetic defined on $GF(2^m)$, where N is the number of generated shares to be generated and N is greater than K; and
generating N shares of the secret bit string for distribution among cooperating entities, each of the N shares including a component of the N-tuple,
wherein generating N shares of the secret bit string further comprises multiplying a matrix of rank K with the K-tuple to obtain the N-tuple, the matrix including (N×K) elements of $GF(2^m)$ and
forming each of the N shares by including a row of the (N×K) matrix and a corresponding component of the N-tuple in each of the N shares, and
wherein each share represents an equation for a K-dimensional hyperplane over $GF(2^m)$.

2. The method of claim 1, further comprising:
determining a primitive polynomial with degree m and binary coefficients; and
computing the N shares of the secret using arithmetic defined on $GF(2^m)$, modulo the primitive polynomial.

3. The method of claim 1, wherein representing the secret as a secret bit string of length m further comprises:
  representing the secret as a binary bit string; and
  extending the binary bit string to length m by pre-pending random elements of GF(2).

4. The method of claim 1, wherein embedding the secret bit string in a K-tuple further comprises:
  generating (K-1) random elements of $GF(2^m)$ as (K-1) elements of the K-tuple; and
  using the secret bit string as one component of the K-tuple.

5. The method of claim 1, wherein extending the K-tuple to an N-tuple further comprises:
  generating a matrix having N rows and K columns of random elements of $GF(2^m)$; and
  verifying that the rank of the matrix is K by a sequence of multiply and subtract operations applied to sub-matrices of the matrix, wherein the multiply includes multiplying a row by a multiplicative inverse, in $GF(2^m)$, of a leading term of the row.

6. The method of claim 1, wherein extending the K-tuple to an N-tuple further comprises:
  generating a matrix of size (N×K) having identity elements as diagonal elements, zeros below the diagonal elements, and random elements of $GF(2^m)$ above the diagonal elements; and
  performing a sequence of multiply and add operations on rows of the matrix to generate the matrix of rank K.

7. The method of claim 6, wherein performing a sequence of multiply and add operations further comprises:
  multiplying a target row by a non-zero random element of $GF(2^m)$ to produce a scaled target row; and
  for each row lower than the target row, adding a random multiple of the scaled target row to the row.

8. A system for dividing a secret into a plurality of shares, the system comprising:
  data storage which stores the secret; and
  a computing entity coupled to the data storage which generates N shares of the secret for distribution among cooperating entities, the computing entity comprising:
    an embedding unit which embeds the secret, represented as a secret bit string of length m, in a K-tuple, wherein K is the number of shares necessary for secret reconstruction; and
    a matrix multiplier which extends the K-tuple to an N-tuple using a linear transformation by multiplying the K-tuple with a matrix of rank K including (N×K) elements of $GF(2^m)$ using arithmetic defined on $GF(2^m)$, where N is the number of shares to be generated and N is greater than K,
      wherein the N shares are generated by including a row of the (N×K) matrix and a corresponding component of the N-tuple in each of the N shares, and
      wherein each share represents an equation for a K-dimensional hyperplane over $GF(2^m)$.

9. The system of claim 8, wherein the computing entity further comprises:
  a random matrix generator to generate the matrix having N rows and K columns of random elements of $GF(2^m)$ and to verify that the rank of the matrix is K by a sequence of multiply and subtract operations applied to sub-matrices of the matrix, the random matrix generator comprising:
    a multiplier to multiply a row by a multiplicative inverse, in $GF(2^m)$, of a leading term of the row; and
    a subtractor comprising XOR operators to subtract the row from each of its subsequent rows.

10. The system of claim 8, wherein the computing entity further comprises:
  a random matrix generator to generate the matrix of size (N×K) having identity elements as diagonal elements, zeros below the diagonal elements, and random elements of $GF(2^m)$ above the diagonal elements, the random matrix generator comprising:
    a multiplier to multiply a row by a random element of $GF(2^m)$; and
    an adder comprising XOR operators to add a random multiple of the row to each of its lower rows.

11. A non-transitory computer readable storage medium including instructions that, when executed by a processing system, cause the processing system to perform a method comprising:
  representing the secret as a secret bit string of length m;
  embedding, by a processor, the secret bit string in a K-tuple, wherein K is the number of shares necessary for secret reconstruction;
  extending the K-tuple to an N-tuple by a linear transformation using arithmetic defined on $GF(2^m)$, where N is the number of shares to be generated and N is greater than K; and
  generating N shares of the secret bit string for distribution among cooperating entities,
    wherein generating N shares of the secret bit string further comprises multiplying a matrix of rank K with the K-tuple to obtain the N-tuple, the matrix including (N×K) elements of $GF(2^m)$ and
    forming each of the N shares by including a row of the (N×K) matrix and a corresponding component of the N-tuple in each of the N shares, and
    wherein each share represents an equation for a K-dimensional hyperplane over $GF(2^m)$.

12. The computer readable medium of claim 11, wherein the method further comprises:
  determining a primitive polynomial with degree m and binary coefficients; and
  computing the N shares of the secret using arithmetic defined on $GF(2^m)$, modulo the primitive polynomial.

13. The computer readable medium of claim 11, wherein extending the K-tuple to an N-tuple further comprises:
  generating a matrix of size (N×K) having identity elements as diagonal elements, zeros below the diagonal elements, and random elements of $GF(2^m)$ above the diagonal elements;
  multiplying a target row by a non-zero random element of $GF(2^m)$ to produce a scaled target row; and
  for each row lower than the target row, adding a random multiple of the scaled target row to the row.

* * * * *